N. D. CRAWFORD.
HOSE AND METHOD OF MAKING SAME.
APPLICATION FILED MAY 25, 1917.
1,280,170. Patented Oct. 1, 1918.
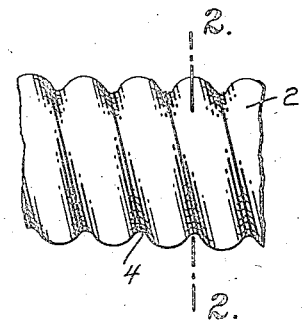
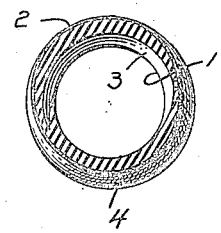
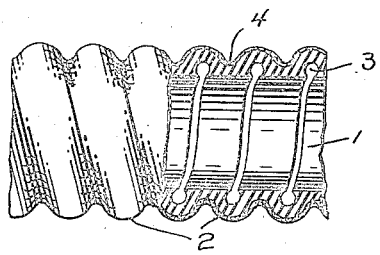
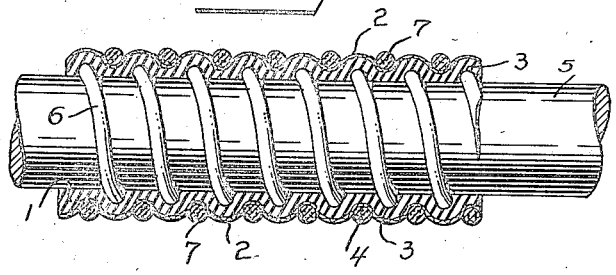
Attest:
S. G. Taylor
Inventor:
Neil D. Crawford,
by Ernest Hopkinson
his Atty.

UNITED STATES PATENT OFFICE.

NEIL D. CRAWFORD, OF ELIZABETH, NEW JERSEY, ASSIGNOR TO NEW YORK BELTING AND PACKING COMPANY, A CORPORATION OF NEW YORK.

HOSE AND METHOD OF MAKING SAME.

1,280,170.   Specification of Letters Patent.   Patented Oct. 1, 1918.

Application filed May 25, 1917. Serial No. 170,841.

*To all whom it may concern:*

Be it known that I, NEIL D. CRAWFORD, a citizen of the United States, residing at Elizabeth, county of Union, and State of New Jersey, have invented certain new and useful Improvements in Hose and Methods of Making Same, of which the following is a full, clear, and exact description.

This invention relates to hose and the method of making same and has for its object to produce a light weight flexible non-collapsible hose or tubing which is adapted for all uses where extreme flexibility and non-collapsibility is essential. Hose manufactured according to this invention is particularly adapted for use in the manufacture of military gas masks, as a connection between the helmets and air or oxygen containers therefor. It is also adapted for use as a connection between the water tanks and boilers of railway locomotives, and as a suction pipe for fire engines.

By my invention I avoid the necessity of providing a wire or other metallic stiffening means in the wall of hose thereby greatly reducing its weight and increasing its flexibility. For a clearer understanding of my invention reference is made to the following description and to the accompanying drawings in which—

Figure 1 is a side elevation of a piece of hose manufactured according to this invention.

Fig. 2 is a cross-sectional view taken on the line 2, 2 of Fig. 1.

Fig. 3 is a view partly in side elevation and partly in longitudinal section, and Fig. 4 is a side elevation of a forming mandrel showing in section a piece of hose built up thereon preparatory to vulcanization.

Referring to the drawings, 1 designates the rubber tubing of the hose, 2 designates the fabric covering thereof, 3 designates a helical hollow space or groove in the inner wall of the hose and 4 designates a helical corrugation or groove in the outer wall of the hose.

The structural characteristics of this hose are produced by my unique method of forming the article, which method is substantially as follows:

As is common in the manufacture of rubber hose a smooth cylindrical pole or mandrel 5 is used as a core upon which to build up the various elements. The mandrel which I use is of the ordinary type having a smooth cylindrical outer surface. About the mandrel 5 is helically wound a flexible core 6 of relatively small diameter. For this core I preferably utilize a relatively non-elastic wire formed from some soft metal such as solder or lead. However, I do not wish to limit myself to the use of a wire as I may use a cord of fibrous material. In case a cord is used however, it is first necessary to coat it with soapstone, graphite or other material which will prevent adhesion to the rubber.

Having placed the core 6 around the mandrel as above described, I place in position thereabout a suitable thickness of rubber 1. This rubber is preferably applied under considerable tension so that it conforms to the irregular surface produced on the mandrel by the convolutions of the core 6. If desired I may next further shape the rubber around the convolutions by winding a cord thereabout to further force the rubber between the turns of wire but as a rule I have not found this step necessary. Over the rubber I next superpose a fabric covering 2 preferably a knit fabric such as stockinet. I have also used woven fabric with good results and therefore do not limit myself to any specific kind of fabric for the covering.

The rubber and fabric are next forced firmly around convolutions of wire 6 by helically winding about the whole a cord or other wrapping 7 applied under sufficient tension to partially embed the fabric in the unvulcanized rubber 1 and at the same time force the rubber between the convolutions of and partly around the wire 6. The built-up structure is next placed in a suitable vulcanizing chamber and there subjected to heat for a sufficient period to vulcanize the rubber. It is then removed and slipped off the mandrel 5, the wire helix 6 slipping off with the hose. The wire 6 is then drawn out of the interior of the hose and may be straightened for future use.

Hose manufactured as above set forth is very flexible and substantially non-collapsible, adapting it particularly for use as a suction conduit. Inasmuch as the surfaces between the grooves 3 nearly contact with each other, a substantially smooth bore is produced in the hose which presents little or no obstruction to the passage of fluids therethrough.

Having thus described my invention, what I claim and desire to protect by Letters Patent is:

1. Flexible rubber hose provided with a hollow helical groove communicating with the interior of the hose through a comparatively narrow helical slot.

2. Flexible rubber hose having a helical groove in its inner wall and an outer helically corrugated surface, the depressions of which alternate with said groove in the inner wall.

3. Hose having a helical groove in the inner wall of the rubber portion, a fabric outer covering and helical corrugations in the outer surface of the hose, the groove of said outer corrugations being disposed between the convolutions of the helical groove in the inner wall.

4. The method of manufacturing a rubber hose with a helical groove on its inner wall which consists in helically winding about a cylindrical mandrel a flexible core, superposing thereon a layer of rubber compound to form a tube, vulcanizing the tube, removing the mandrel from the tube and thereafter removing said flexible core.

5. The method of manufacturing rubber hose having a helical groove on its inner wall and corrugations on its outer wall which consists in helically winding a flexible core about a cylindrical mandrel, superposing thereon a layer of rubber compound, applying a ply of fabric about said rubber, helically wrapping said built-up tube between the convolutions of the core whereby the rubber is forced between and partly around said flexible core, vulcanizing, and thereafter removing the helical wrapping, the mandrel, and the core from the hose.

Signed at New York this 23rd day of May, 1917.

NEIL D. CRAWFORD.